United States Patent [19]

Nihei

[11] Patent Number: 4,951,966
[45] Date of Patent: Aug. 28, 1990

[54] SEAT SLIDE DEVICE WITH WALK-IN MECHANISM AND INERTIA LOCKING TYPE SEATBELT RETRACTOR

[75] Inventor: Masao Nihei, Yokohama, Japan

[73] Assignee: Ohi Seisakusho Co., Ltd., Yokohama, Japan

[21] Appl. No.: 403,884

[22] Filed: Sep. 7, 1989

[30] Foreign Application Priority Data

Sep. 10, 1988 [JP] Japan .......................... 63-118928[U]

[51] Int. Cl.$^5$ ......................... B60R 22/36; B60N 2/12
[52] U.S. Cl. .................................. 280/807; 296/65.1; 297/477; 297/478
[58] Field of Search ............... 280/801, 806, 807, 802, 280/804; 297/468, 477, 478, 480; 296/65.1, 68.1; 180/268

[56] References Cited

U.S. PATENT DOCUMENTS

| | | | |
|---|---|---|---|
| 4,262,932 | 4/1981 | Motonami et al. | 280/802 |
| 4,384,735 | 5/1983 | Maeda et al. | 280/807 |
| 4,730,844 | 3/1988 | Patterson | 280/804 |
| 4,848,795 | 7/1989 | Muraishi | 280/807 |

Primary Examiner—Charles A. Marmor
Assistant Examiner—Karin Tyson
Attorney, Agent, or Firm—Foley & Lardner, Schwartz, Jeffery, Schwaab, Mack, Blumenthal & Evans

[57] ABSTRACT

Disclosed herein is a combination in a motor vehicles. The combination comprises a seat with an inclinable seatback; a seat slide unit for sliding the seat to a desired position, the seat slide unit including movable and stationary rails; a belt retractor connected to the movable rail to move therewith, the belt retractor including a check mechanism which checks the feeding of a seatbelt from the retractor when a certain degree of acceleration is applied thereto; a lock mechanism incorporated with the seat slide unit to lock the movable rail at a desired fore-and-aft position relative to the stationary rail; an operation handle held by the movable rail and pivotally movable between a first position and a second position, the first position being a position to effect the locking of the movable rail relative to the stationary rail, and the second position being a position to cancel the locking of the movable rail relative to the stationary rail; a walk-in mechanism incorporated with the lock mechanism for cancelling the locking of the movable rail relative to the stationary rail when the seatback is inclined forward; a first electric device for making the check mechanism inoperative when electrically energized; a second electric device for energizing the first electric device when the operation handle assumes the second position; and a third device for causing the operation handle to take a position other than the second position thereby to keep the first electric device deenergized when the seatback is inclined forward.

14 Claims, 8 Drawing Sheets

SEAT SLIDE DEVICE WITH WALK-IN MECHANISM AND INERTIA LOCKING TYPE SEATBELT RETRACTOR

BACKGROUND OF THE INVENTION

1. Field of the Invention

The present invention relates to automotive seat slide devices of a type which includes a walk-in mechanism which permits a forward movement of the seat when a seatback is inclined forward, a seatbelt retractor which permits feeding and retracting of a seatbelt associated with the seat and a check mechanism which checks the feeding of the seatbelt when the seat is subjected to a certain shock due to a vehicle collision or the like.

2. Description of the Prior Art

Hitherto, there have been proposed various seat slide devices particularly in the field of passenger cars. Usually, the seat slide device comprises a pair of stationary rails securely mounted on a vehicle floor, and a pair of movable rails mounting thereon a seat and slidably engaged with the stationary rails. Thus, upon requirement of the seat position adjustment, the movable rails are moved together with the seat on and along the stationary rails to a desired position.

Some of these seat slide devices are of a type which has a so-called "inertia locking type seatbelt retractor" fixed to one of the movable rails. In fact, the seat slide devices of this type are employed in a passive seat belt system which automatically fits the passenger with the seatbelt when the door is closed.

One of the seat slide devices of the above-mentioned type is shown in Japanese Utility Model First Provisional Publication No. 63-58050.

That is, in the device of the publication, under a normal locked condition of the seat slide device wherein the movable rails are locked to the stationary rails, the inertia locking seatbelt retractor secured to the movable rail is in OFF state wherein feeding and retracting of the seatbelt are available in response to the forward and rearward inclination of the upper part of a passenger on the seat. While, when, due to a vehicle collision or the like, the retractor is applied with a certain shock, an inertia sensor associated with the retractor senses the shock and instantly causes the retractor to lock the seatbelt and thus restrain the passenger.

In order to move the seat from the locked position to a new desired position, an operation handle is manipulated to cancel the locked condition of the movable rails and then, with the operation handle kept manipulated, the seat is pushed forward or rearward to the new desired position. However, for carrying out this movement, it is necessary to disable the inertia sensor from sensing a shock. That is, if the inertia sensor becomes operated by a shock produced during, for instance, a forward movement of the seat, the passenger, viz., belt wearer, is uncomfortably pressed by the locked seatbelt against the seatback.

In the seat slide device of the publication, there is thus employed an electric system which comprises a switch which turns ON when the operation handle is manipulated for unlocking the movable rails, and an electric actuator which is connected to the switch, so that upon the switch turning on, the actuator makes the inertia sensor inoperative.

However, the seat slide device of the publication becomes to have a drawback when it is equipped with a walk-in mechanism. That is, in this case, a so-called transmitting mechanism is usually employed for converting the forwardly inclining movement of the seatback to the lock cancelling movement of the operation handle. However, this means that during the time for which the seatback is kept inclined forward, the switch is kept on causing the wasteful energization of the electric actuator. In fact, it often occurs that the passenger leaves the vehicle with the seatback kept inclined forward. This causes an undesirable over-discharging of the battery mounted on the vehicle.

SUMMARY OF THE INVENTION

It is therefore an object of the present invention to provide a seat slide device having a walk-in mechanism and an inertia locking type seatbelt retractor, which device is free of the above-mentioned drawback.

That is, in accordance with the present invention, there is provided a seat slide device with a walk-in mechanism and an inertia locking type seatbelt retractor, in which even when the seatback is kept inclined forward for a long time, the undesired over-discharging of the battery does not occur.

According to the present invention, there is provided, in a motor vehicle, a combination. The combination comprises a seat with an inclinable seatback; a seat slide unit for sliding the seat to a desired position, the seat slide unit including movable and stationary rails; a belt retractor connected to the movable rail to move therewith, the belt retractor including a check mechanism which checks the feeding of a seatbelt from the retractor when a certain degree of acceleration is applied thereto; a lock mechanism incorporated with the seat slide unit to lock the movable rail at a desired fore-and-aft position relative to the stationary rail; an operation handle held by the movable rail and pivotally movable between a first position and a second position, the first position being a position to effect the locking of the movable rail relative to the stationary rail, and the second position being a position to cancel the locking of the movable rail relative to the stationary rail; a walk-in mechanism incorporated with the lock mechanism for cancelling the locking of the movable rail relative to the stationary rail when the seatback is inclined forward; first means for making the check mechanism inoperative when electrically energized; second means for energizing the first means when the operation handle assumes the second position; and third means for causing the operation handle to take a position other than the second position thereby to keep the first means deenergized when the seatback is inclined forward.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
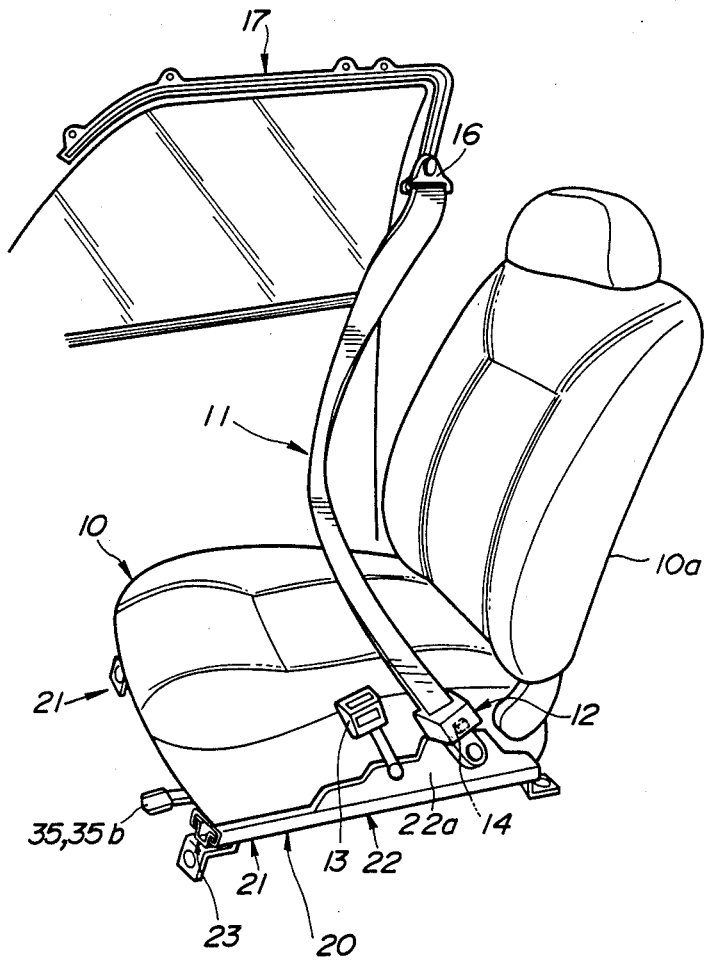
FIG. 1 is a perspective view of an automotive seat to which the present invention is practically applied.

Referring to FIG. 1 of the accompanying drawings, there is shown an automotive seat 10 which is mounted on a seat slide device 20.

The seat slide device 20 comprises generally two (viz., left and right) parallel slide units 21 which are arranged on a vehicle floor and extend in a fore-and-aft direction with respect to the vehicle.

Since the two slide units 21 are substantially the same in construction, the following description will be directed to only the left unit 21, as viewed in FIG. 1, for ease of explanation.

The slide unit 21 comprises a stationary rail 23 which is securely mounted on the vehicle floor and a movable rail 22 which is slidably disposed on the stationary rail 23 and mounts thereon the seat 10.

The movable rail 22 has an enlarged bracket 22a secured thereto. A belt retractor 12 for a shoulder belt 11 is fixed to the bracket 22a. A buckle 13 for a lap belt (not shown) is also connected to the bracket 22a at the front of the retractor 12.

The belt retractor 12 has therein a biasing means by which the shoulder belt 11 is biased in the belt retracting direction. The retractor 12 is further equipped with a check mechanism 14 which checks the feeding of the belt 11 upon sensing a certain degree of shock or acceleration applied thereto. For this, the check mechanism 14 has an acceleration sensor mounted therein.

Figure 20:
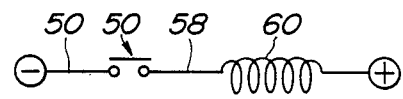
FIG. 20 is a circuit in which the rotary switch is arranged.

A solenoid type stopper is further incorporated with the check mechanism 14, which comprises a stopper which disables the check mechanism 14 from checking the feeding of the belt when pivoted to a certain angular position and a solenoid 60 (see FIG. 20) which attracts the stopper to the certain angular position when electrically energized.

An upper end of the shoulder belt 11 is held by a sliding bracket 16 which is slidably engaged with a guide rail 17. The guide rail 17 is secured to and extends along a sash of the automotive door. A geared cable (not shown) is received behind the guide rail 17 to move the sliding bracket 16 along the guide rail 17 between a passenger releasing position wherein the shoulder belt 11 releases a seat occupant and a passenger restraining position wherein the shoulder belt 11 restrains the seat occupant. Thus, the shoulder belt 11, the retractor 12, the sliding bracket 16 and the guide rail 17 constitute a so-called "passive seatbelt system".

Figure 2:
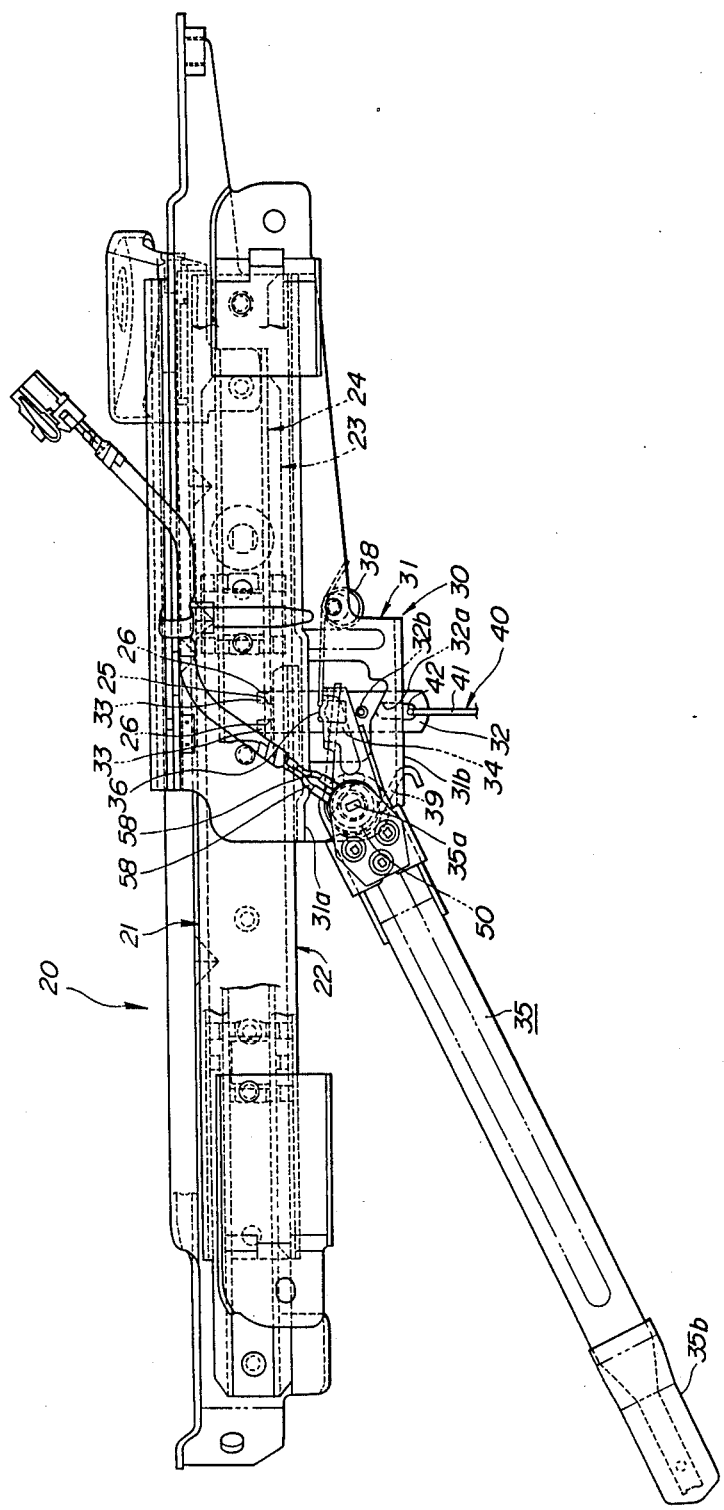
FIG. 2 is a plan view of one of rail units employed in a seat slide device, which rail unit having an operation handle pivotally connected thereto.
Figure 3:
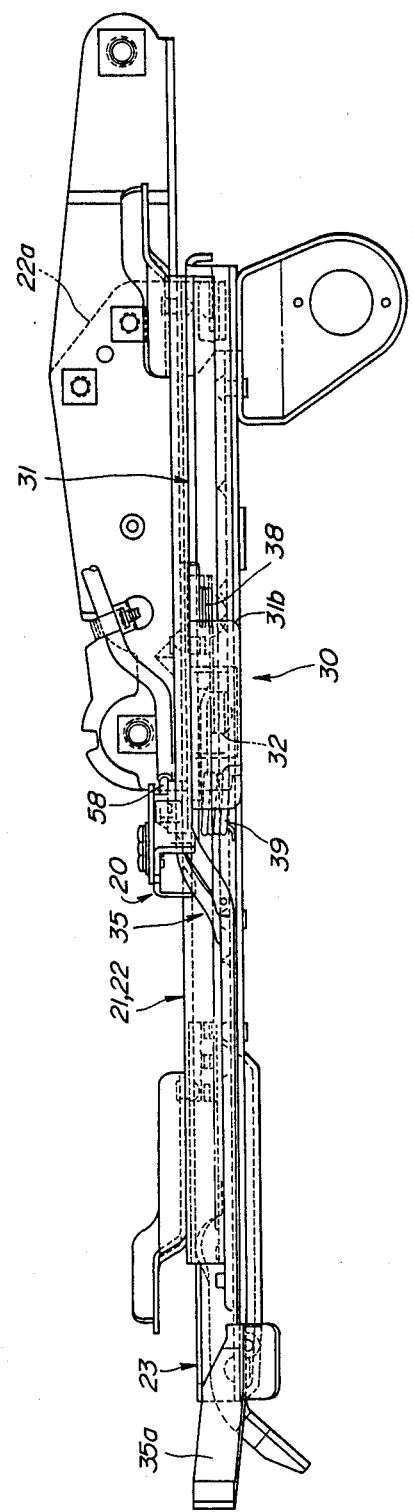
FIG. 3 is a side view of the rail unit of FIG. 2.
Figure 4:
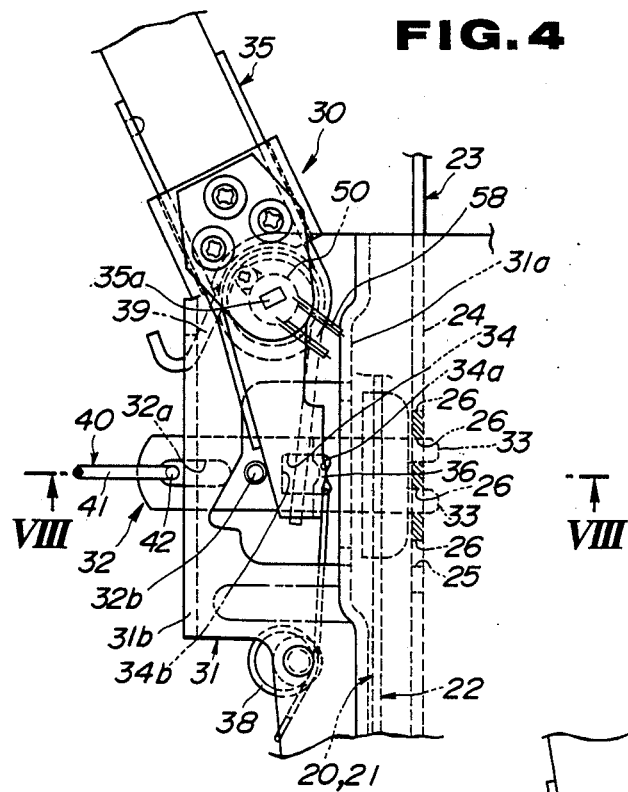
FIGS. 4 to 7 are plan views of an essential part of the seat slide device, showing different conditions of the same respectively.

As may be understood from FIGS. 2 and 4, the stationary rail 23 has at its one side wall 24 an engaging portion 25 which includes longitudinally aligned latching notches 26.

The movable rail, 22 has a lock mechanism 30 mounted thereon. The lock mechanism 30 comprises a base bracket 31 secured to the movable rail 22, a latch member 32 linearly movably held by the base bracket 31 and an operation handle 35 for actuating the latch member 32.

Figure 8:
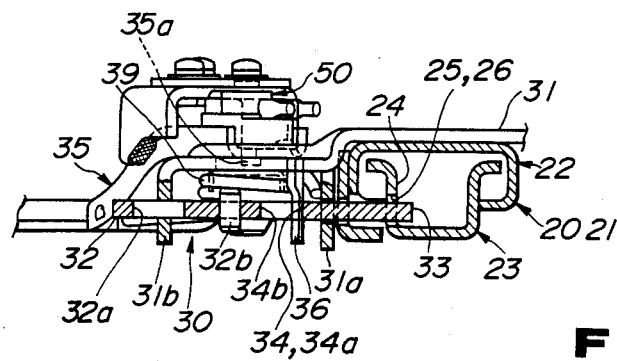
FIG. 8 is a sectional view taken along the line VIII—VIII of FIG. 4.
Figure 9:
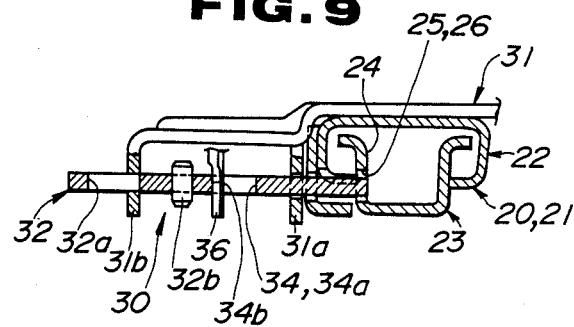
FIG. 9 is a sectional view taken along the line IX—IX of FIG. 5.

As is seen from FIG. 8, the base bracket 31 has two downwardly extending supporting portions 31a and 31b which have apertures (no numerals) through which the latch member 32 slidably passes. The latch member 32 has a forked end 33 (see FIG. 4) which is selectively engageable with two of the latching notches 26 of the stationary rail 23.

The operation handle 35 is pivotally connected at its inside end portion to the base bracket 31 through a pivot pin 35a. As is seen from FIG. 2, a grip member 35b is fixed to the free end of the operation handle 35.

As is seen from FIGS. 4 and 8, the operation handle 35 has at its inside end a downwardly bent lug 36 which is pivotally engaged with an aperture 34 formed in the latch member 32.

The latch member 32 is biased rightward in FIG. 4, that is, in a direction to engage with the latching notches 26 of the stationary rail 23, by means of a coiled spring 38. For this biasing, opposite ends of the spring 38 are hooked to the base bracket 31 and the latch member 32 respectively.

The operation handle 35 is biased to pivot in a counterclockwise direction in FIG. 2 by means of another coiled spring 39. For this biasing, opposite ends of the spring 39 are hooked to the base bracket 31 and the lug 36 of the operation handle 35 respectively.

The latch member 32 has at its base portion a slot 32a (see FIG. 2) to which an end of a drive cable 41 of a walk-in mechanism 40 is operatively engaged. That is, under a rest condition of the walk-in mechanism 40, the end of the drive cable 41 is loosely engaged with the slot 32a. But, when the walk-in mechanism 40 is being operated, that is, when the seatback 10a of the seat 10 is inclined forward, the end of the drive cable 41 becomes engaged with an outward end of the slot 32a to pull the latch member 32 in a direction to disengage the forked end 33 from the latching notches 26. The latch member 32 has a stopper pin 32b which is brought into abutment with the supporting portion 31b of the base bracket 31 to suppress excessive backward movement of the latch member 32.

As is seen from FIG. 4, a position detector switch 50 is mounted on the base bracket 31, which detects the angular position taken by the operation handle 35.

Figure 12:
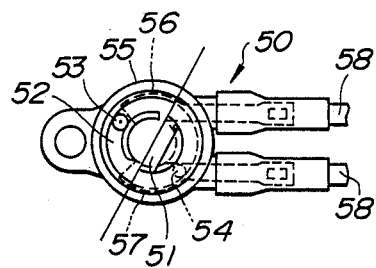
FIGS. 12 to 14 are plan views of a rotary switch employed in the invention, showing different conditions of the same respectively.

As is seen from FIG. 12, the position detector switch 50 is of a rotary switch which comprises a rotor 51 which rotates together with the pivot pin 35a of the operation handle 35, and a cylindrical outer base member 55 which surrounds the rotor 51 with a cylindrical clearance defined therebetween. The rotor 51 and the outer base member 55 are each constructed of an electrically insulating material.

The rotor 51 has a conductive circular plate 52 coaxially mounted thereon. The circular plate 52 has at diametrically opposed portions two projected contacts 53 and 54. The outer base member 55 has at diametrically opposed portions of its circular bore two arcuate contacts 56 and 57 which are contactable with the projected contacts 53 and 54 when the latter come to predetermined angular positions. Thus, the position detector switch 50 assumes ON condition only when both of the projected contacts 53 and 54 of the rotor 51 are brought into contact with the actuate contacts 56 and 57 of the outer base member 55.

Lead wires 58 and 58 extend from the two arcuate contacts 56 and 57. As is seen from FIG. 20, one lead wire 58 is connected through the solenoid 60 to a positive terminal of a battery and the other lead wire 58 is connected to a negative terminal of the battery. Thus, when the position detector switch 50 assumes the ON position, the solenoid type stopper of the check mechanism 14 becomes operative to make the check mechanism 14 inoperative. It is thus to be noted that under ON condition of the switch 50 the belt retractor 12 allows free feeding and retracting of the shoulder belt 11 in response to an application of external force thereto irrespective of a shock or acceleration applied to the seat.

In the following, operation will be described with reference to the drawings.

For ease of description, the same will be commenced with respect to a full-locked condition of the lock mechanism 30 of the seat slide device 20.

Under this full-locked condition, the lock mechanism 30 assumes a condition as shown in FIGS. 4 and 8, and the position detector switch 50 assumes a condition as shown in FIG. 12. Furthermore, the downwardly bent lug 36 of the operation handle 35 is in contact with a front end 34a of the aperture 34 of the latch member 32 causing the switch 50 to assume OFF condition. That is, as is seen from FIG. 12, although the projected contact 54 of the rotor 51 is in contact with the arcuate contact 57 of the base member 55, the other projected contact 53 fails to contact with the other arcuate contact 56.

Under this, the solenoid 60 is not energized and thus the check mechanism 14 of the belt retractor 12 is alive. Thus, when, due to a vehicle collision or the like, the acceleration sensor (not shown) detects a certain degree of shock or acceleration, the check mechanism 14 checks the feeding of the shoulder belt 11 and thus restrains the belt wearer on the seat.

Figure 5:
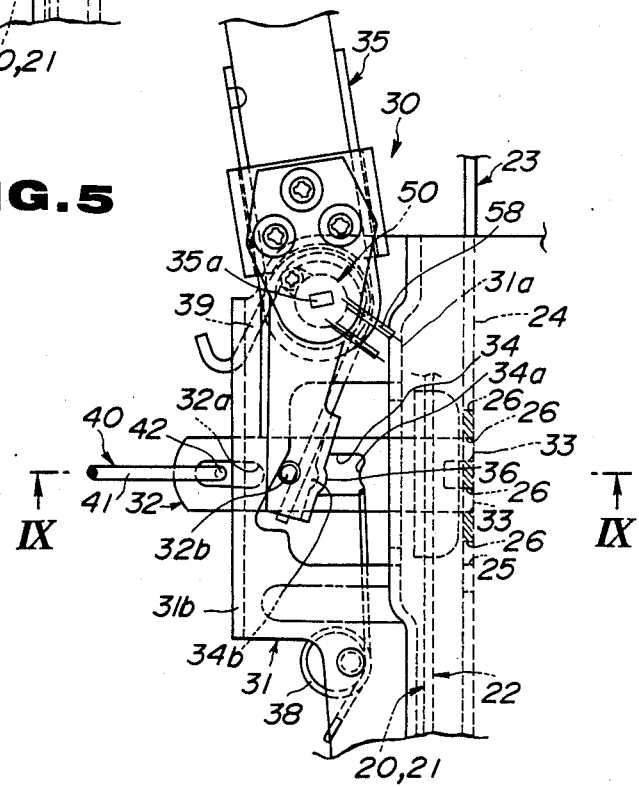

When the operation handle 35 is pivoted in a clockwise direction in FIG. 2 against the force of the coiled spring 39, the downwardly bent lug 36 of the operation handle 35 pushes a rear end 34b of the aperture 34 of the latch member 32 and thus moves back the latch member 32 against the coiled spring 38. With this, the forked end 33 of the latch member 32 is about to disengage from the latching notches 26 of the stationary rail 23, so that the lock mechanism 30 assumes a half-locked condition as shown in FIGS. 5 and 13.

Figure 13:
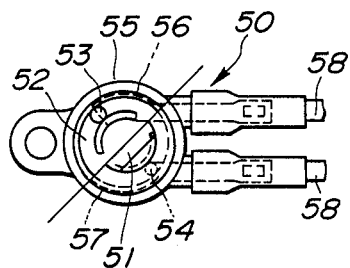

In response to the pivotal movement of the operation handle 35, the rotor 51 of the position detector switch 50 is turned in a clockwise direction in FIG. 12 and thus the switch 50 assumes a condition as shown in FIG. 13.

It is to be noted that under the half-locked condition of the lock mechanism 30, the projected contact 53 of the rotor 51 still fails to contact with the arcuate contact 56 of the base member 55, and thus the position detector switch 50 is still in OFF condition. Thus, under the half-locked condition of the lock mechanism 30, the check mechanism 14 of the belt retractor 12 is still alive.

Figure 6:
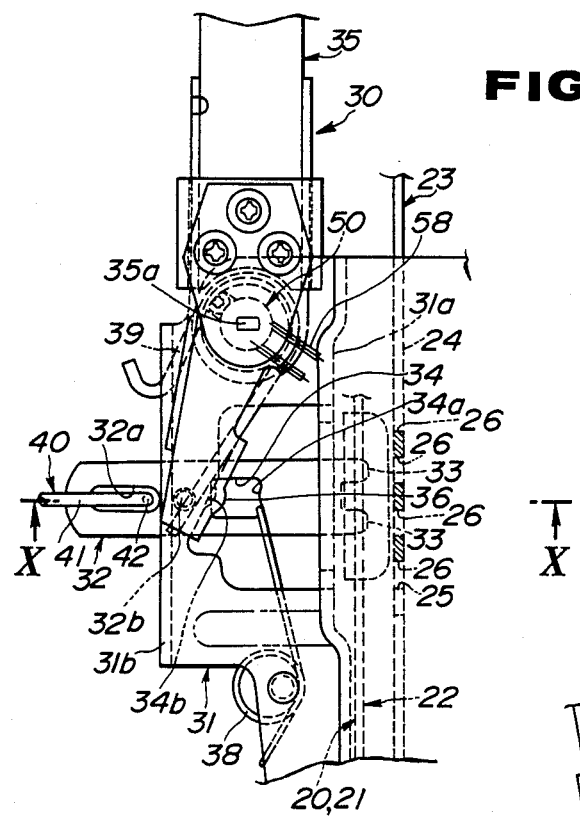
Figure 10:
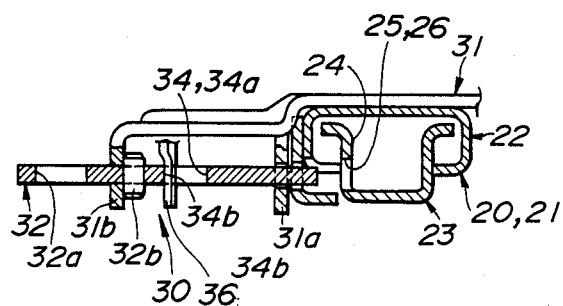
FIG. 10 is a sectional view taken along the line X—X of FIG. 6.
Figure 11:
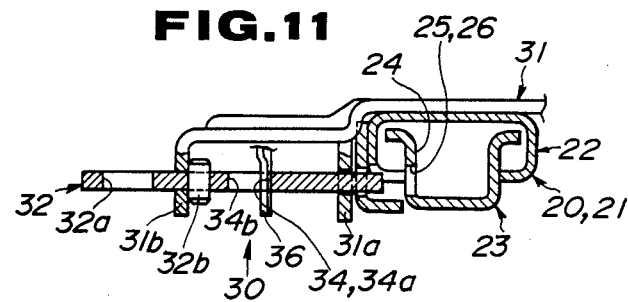
FIG. 11 is a sectional view taken along the line XI—XI of FIG. 7.

When the operation handle 35 is further pivoted in the same direction, that is, in the clockwise direction in FIG. 2, the backward movement of the latch member 32 is further advanced and thus the forked end 33 of the latch member 32 becomes disengaged from the latching notches 26 of the stationary rail 23 as shown in FIGS. 6 and 10. Thus, under this condition, the lock mechanism 30 assumes an unlocked condition.

Figure 14:
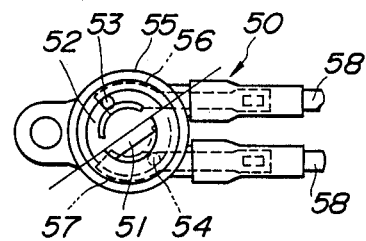
Figure 15:
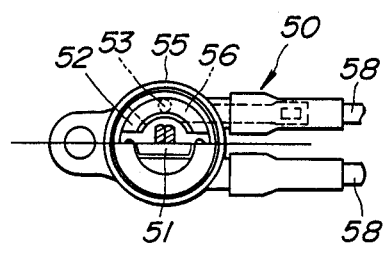
FIG. 15 is a plan view of the rotary switch with a part removed.
Figure 16:
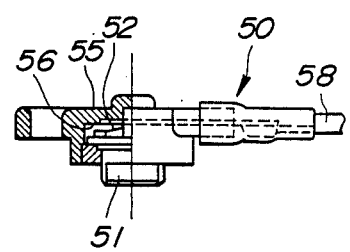
FIG. 16 is a side view of the rotary switch with a part removed.
Figure 17:
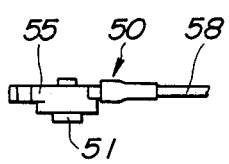
FIG. 17 is a side view of the rotary switch.
Figure 18:
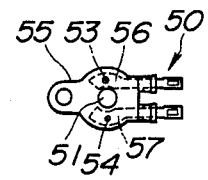
FIG. 18 is a plan view of the rotary switch.
Figure 19:
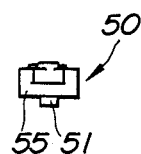
FIG. 19 is a front view of the rotary switch.

In response to the pivotal movement of the operation handle 35 thus carried out, the rotor 51 of the position detector switch 50 is further turned in the same direction, that is, in the clockwise direction in FIG. 13, and thus finally the switch 50 assumes a condition as shown in FIG. 14.

It is to be noted that under the unlocked condition of the lock mechanism 30, the projected contacts 53 and 54 of the rotor 51 of the switch 50 are both in contact with the arcuate contacts 56 and 57 respectively causing the switch 50 to assume its ON condition. Thus, the solenoid 60 becomes energized and thus check mechanism 14 of the belt retractor 12 becomes inoperative.

Thus, under this unlocked condition of the lock mechanism 30, the feeding and retracting of the shoulder belt 11 is freely carried out by the belt retractor 12 even when, due to forward or rearward movement, of the seat 10 for its position adjustment until the acceleration sensor senses a certain shock.

When, after the seat 10 is moved to a new desired position, the operation handle 35 is released from an operator's hand, the operation handle 35 and the latch member 32 are returned to their original positions due to the force of the coiled springs 38 and 39 bringing the forked end 33 of the latch member 32 into latching engagement with new latching notches 26 of the stationary rail 23. If, due to misalignment of the forked end 33 with respect to the latching notches 26, the returning of the latch member 32 fails to achieve the latched engagement with the latching notches, the seat 10 is moved forward or rearward but slightly. With this, the forked end 33 of the latch member 32 becomes mated with the latching notches 26 and thus achieves the latching engagement with the same. Thus, under this condition, the seat 10 is fully locked at the new position, as is shown in FIGS. 4 and 8. As is described hereinabove, under this full-locked condition, the position detector switch 50 assumes OFF position and thus the check mechanism 14 of the belt retractor 12 is alive.

When now the seatback 10a (see FIG. 1) is inclined forward, the walk-in mechanism 40 operates. That is, upon the forward inclination of the seatback 10a, the drive cable 41 (see FIG. 2) is pulled and thus the latching member 32 is moved back against the force of the coiled springs 38 and 39. Thus, the operation handle 35 having the downwardly bent lug 36 operatively engaged with the aperture 34 of the latch member 32 is forced to pivot in a clockwise direction in FIG. 4 about the pivot pin 35a.

Figure 7:
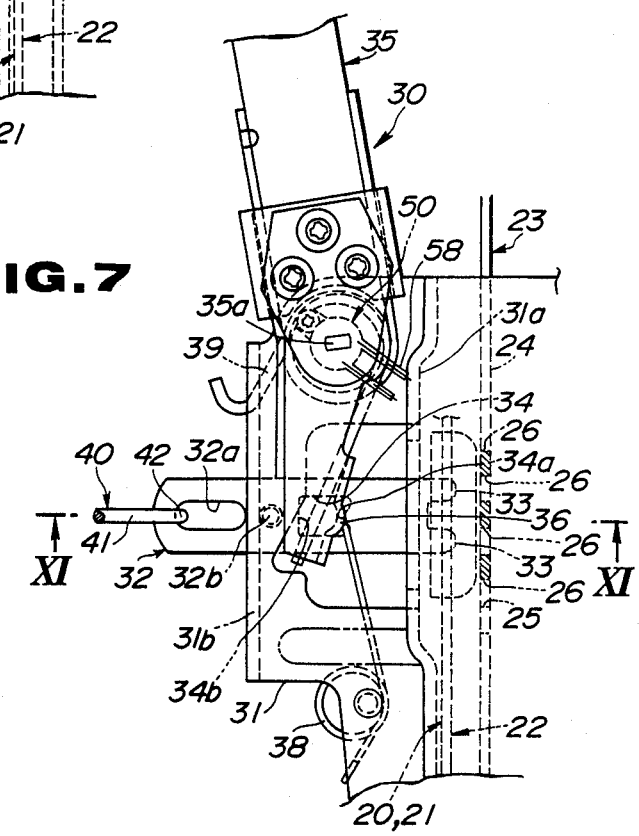

When the stopper pin 32b of the latch member 32 is brought into abutment with the supporting portion 31b of the base bracket 31, the backward movement of the latch member 32 stops and the forked end 33 of the latch member 32 is disengaged from the latching notches 26 of the stationary rail 23. Thus, the seat 10 is permitted to move forward with an aid of a spring (not shown) for easy ingress and egress for a rear seat passenger. Under this condition wherein the seatback 10a is kept inclined forward, the operation handle 35 assumes a position as shown in FIG. 7, the position being a position slightly dislocated in a counterclockwise direction from the position as shown in FIG. 5. That is, in the position of the operation handle 35 as shown in FIG. 7, the projected contact 53 of the rotor 51 fails to contact with the arcuate contact 56 while the other projected contact 54 is in contact with the other arcuate contact 57, so that the position detector switch 50 assumes OFF condition.

Thus, during the time for which the seat 10 assumes the walk-in condition, the position detector switch 50 keeps OFF condition and thus the solenoid 60 is kept deenergized.

It is thus to be noted that unlike the case of the aforementioned conventional device, the undesired over-discharging of the battery does not occur in the present invention even when the seatback 10a is kept inclined forward for a long time.

When the forwardly inclined seatback 10a is raised up to a certain raised position, the latch member 32 is released from the drive cable 41, and due to the biasing force of the coiled springs 38 and 39, the latch member 32 is advanced to achieve a latched engagement between the forked end 33 thereof and the latching notches 26 of the stationary rail 23. Upon this, the operation handle 35 is returned to the full-locked position as shown in FIG. 4.

As will be understood from the foregoing description, in the present invention, the forward inclination of the seatback 10a to achieve the walk-in condition of the seat 10 does not induce energization of the solenoid 60 of the solenoid type stopper of the check mechanism 14. Thus, the undesired over-discharging of the battery does not occur even when the seatback 10a is kept inclined foward for a long time.

Although the foregoing description is directed to the latch member 32 which is moved linearly, the latch member 32 may be of a pivotal member which is pivotally connected to the base bracket 31 and actuated by the operation handle 35.

What is claimed is:

1. In a motor vehicle,
a combination which comprises:
a seat with an inclinable seatback;
a seat slide unit for sliding said seat to a desired position, said seat slide unit including movable and stationary rails;
a belt retractor connected to said movable rail to move therewith, said belt retractor including a check mechanism which checks the feeding of a seatbelt from the retractor when a certain degree of acceleration is applied thereto;
a lock mechanism incorporated with said seat slide unit to lock said movable rail at a desired fore-and-aft position relative to said stationary rail;
an operation handle held by said movable rail and pivotally movable between a first position and a second position, said first position being a position to effect the locking of said movable rail relative to said stationary rail, and said second position being a position to cancel the locking of said movable rail relative to said stationary rail;
a walk-in mechanism incorporated with said lock mechanism for cancelling the locking of said movable rail relative to said stationary rail when said seatback is inclined forward;
first means for making said check mechanism inoperative when electrically energized;
second means for energizing said first means when said operation handle assumes said second position; and
third means for causing said operation handle to take a position other than said second position thereby to keep the first means deenergized when said seatback is inclined forward.

2. A combination as claimed in claim 1, in which said first means comprises a stopper which disables said check mechanism from checking the feeding of the belt which pivoted to a certain angular position, and a solenoid which pulls said stopper to the certain angular position when electrically energized.

3. A combination as claimed in claim 2, in which said second means comprises a position detector switch actuated by said operation handle, said switch connecting said solenoid to an electric power source when said operation handle is pivoted to said second position.

4. A combination as claimed in claim 3, in which said third means comprises a lost-motion mechanism which is incorporated with said lock mechanism, said operation handle and said walk-in mechanism, said lost-motion mechanism being so arranged that when said seatback is inclined forward, said walk-in mechanism cancels the locking of said movable rail relative to said stationary rail and at the same time said operation handle is pivoted to a third position at which said position detector switch fails to connect said solenoid to said electric power source.

5. A combination as claimed in claim 4, in which said third position of said operation handle is defined between said first and second positions.

6. A combination as claimed in claim 5, in which said lost-motion mechanism comprises:
a latch member which constitutes a part of said lock mechanism, said latch member being held by said movable rail and movable between a lock position wherein said latch member is latched to said stationary rail and an unlock position wherein said latch member is unlatched from said stationary rail;
fourth means defining in said latch member an aperture;
a lug portion defined by said operation handle, said lub portion being put in said aperture of said latch member;
fifth means defining in said latch member a slot; and
a drive cable having one end slidably engaged with said slot of said latch member, said drive cable being pulled in a direction to move said latch member toward said unlock position when said seatback is inclined forward.

7. A combination as claimed in claim 6, in which said position detector switch is of a rotary switch which comprises:
a rotor which is pivotal together with said operation handle about a pivot axis of said operation handle;
two projected contacts carried by said rotor through a conductor;
a cylindrical outer member which rotatably receives therein said rotor; and
two stationary contacts carried by said outer member, said stationary contacts being contactable with said projected contacts respectively when said rotor assumes a given angular position.

8. A combination as claimed in claim 7, in which said latch member is biased toward said lock position by a coiled spring.

9. A combination as claimed in claim 8, in which said operation handle is biased toward said first position by a coiled spring.

10. A combination as claimed in claim 9, in which said latch member has a stopper for suppressing an excessive movement thereof.

11. A combination as claimed in claim 4, in which said check mechanism of said belt retractor includes an acceleration sensor which senses an abnormal acceleration applied thereto.

12. A combination as claimed in claim 11, in which said lock mechanism comprises:
   means defining in said stationary rail a plurality of latching notches;
   a base bracket secured to said movable rail to move therewith; and
   a latch member linearly movably held by said base bracket, said latch member having one forked end which is latchingly engageable with adjacent two of said latching notches of the stationary rail.

13. A combination as claimed in claim 12, in which said latch member has an aperture into which a lug defined by said operation handle is loosely received, so that the pivotal movement of said operation handle between said first and second positions induces a lost-motion linear movement of the latch member toward and away from said latching notches of the stationary rail.

14. A combination as claimed in claim 13, in which said latch member further has a slot to which an end of a drive cable of said walk-in mechanism is slidably engaged, said drive cable being pulled in a direction to move said latch member away from said latching notches of said stationary rail when said seatback is inclined forward.

* * * * *